(12) United States Patent
Livingston et al.

(10) Patent No.: US 9,289,878 B2
(45) Date of Patent: Mar. 22, 2016

(54) GRINDERS WITH FRICTION DRIVES

(71) Applicant: Ingersoll-Rand Company, Davidson, NC (US)

(72) Inventors: Patrick Sean Livingston, Easton, PA (US); Joseph Constantine Bouboulis, Asbury, NJ (US); Douglas E. Pyles, Bethlehem, PA (US); Gregory P. Albert, Nazareth, PA (US); James F. Bouchard, Bethlehem, PA (US)

(73) Assignee: Ingersoll-Rand Company, Davidson, NC (US)

( * ) Notice: Subject to any disclaimer, the term of this patent is extended or adjusted under 35 U.S.C. 154(b) by 202 days.

(21) Appl. No.: 14/015,452

(22) Filed: Aug. 30, 2013

(65) Prior Publication Data

US 2015/0065018 A1 Mar. 5, 2015

(51) Int. Cl.
*B24B 47/12* (2006.01)
*B24B 55/00* (2006.01)
*F16H 15/08* (2006.01)
*B24B 23/02* (2006.01)
*B24B 49/16* (2006.01)
*F16H 13/00* (2006.01)

(52) U.S. Cl.
CPC .............. *B24B 47/12* (2013.01); *B24B 23/028* (2013.01); *B24B 49/16* (2013.01); *B24B 55/00* (2013.01); *F16H 13/00* (2013.01); *F16H 15/08* (2013.01); *Y10T 29/49464* (2015.01)

(58) Field of Classification Search
CPC ........ B24B 23/00; B24B 23/02; B24B 23/028
USPC ........................................ 451/359
See application file for complete search history.

(56) References Cited

U.S. PATENT DOCUMENTS

| | | | |
|---|---|---|---|
| 2,273,626 A * | 2/1942 | Connell | 74/810.1 |
| 6,968,908 B2 | 11/2005 | Tokunaga et al. | |
| 7,216,749 B2 * | 5/2007 | Droste | 192/56.61 |
| 7,422,075 B2 | 9/2008 | Hahn | |
| 7,743,683 B2 | 6/2010 | Dayton et al. | |

(Continued)

FOREIGN PATENT DOCUMENTS

DE   20 2012 012 654 U1   8/2013

OTHER PUBLICATIONS

Deprag CZ A.S., "Air Turbine Grinders—Angle," Oct. 2012, 2 pages.

(Continued)

*Primary Examiner* — Monica Carter
*Assistant Examiner* — Lauren Beronja
(74) *Attorney, Agent, or Firm* — Barnes & Thornburg LLP

(57) ABSTRACT

In one illustrative embodiment, a grinder may comprise an arbor configured to rotate about a first axis and to support a grinding wheel for rotation therewith, a gear surrounding a first portion of the arbor and having a slip fit with the first portion of arbor, a motor configured to drive rotation of a drive train including the gear, a collar surrounding a second portion of the arbor and having an interference fit with the second portion of the arbor such that the collar is constrained for rotation with the arbor about the first axis, and at least one spring disposed between the gear and the collar and configured to exert a biasing force along the first axis such that one or more resulting friction forces cause the arbor to rotate with the gear when a torque exerted on the gear is less than a threshold torque.

16 Claims, 4 Drawing Sheets

(56) References Cited

U.S. PATENT DOCUMENTS

| | | | |
|---|---|---|---|
| 7,793,420 B2 * | 9/2010 | Griep et al. | 30/394 |
| 7,886,841 B2 * | 2/2011 | Armstrong | 173/176 |
| 7,946,354 B2 | 5/2011 | Elmqvist | |
| 8,297,374 B2 | 10/2012 | Suzuki | |
| 8,347,750 B2 | 1/2013 | Bodine et al. | |
| 8,388,417 B2 | 3/2013 | Trautner et al. | |
| 2006/0276114 A1 * | 12/2006 | Gallagher et al. | 451/344 |
| 2007/0158088 A1 | 7/2007 | Ikuta | |
| 2009/0179507 A1 * | 7/2009 | Tanimoto | 310/50 |
| 2012/0261150 A1 | 10/2012 | Aoki | |
| 2013/0029570 A1 | 1/2013 | Whelan | |
| 2013/0048330 A1 | 2/2013 | Ikuta et al. | |

OTHER PUBLICATIONS

Ingersoll Rand, "VT22 Series Air Grinder," Mar. 2011, 2 pages.
European Patent Office, Communication from European Patent Application No. 14175273.3, Jun. 15, 2015, 5 pages.

* cited by examiner

GRINDERS WITH FRICTION DRIVES

TECHNICAL FIELD

The present disclosure relates, generally, to grinders (and other similar tools) and, more particularly, to grinders (and other similar tools) with friction drives.

BACKGROUND

A grinder, sander, or polisher is a power tool that includes a motor configured to drive rotation of a grinding wheel, a cut-off disc, a sanding disc, a polishing wheel, or like implement. In the present disclosure, the term "grinder" is used to refer to any of the foregoing, or similar, power tools, while the term "grinding wheel" is used to refer to any of the foregoing, or similar, implements. One illustrative type of grinder is an angle grinder, in which a rotor of the motor rotates about an axis that is non-parallel to an axis about which the grinding wheel rotates. For instance, in some angle grinders, the rotor of the motor and the grinding wheel may rotate about axes that are substantially perpendicular to one another. A grinder may include a drive train (including, by way of example, a number of gears) that transfers rotation from the motor to the grinding wheel. An angle grinder typically includes a set of bevel gears that transfers rotation from the axis about which the rotor rotates (or an axis parallel thereto) to the axis about which the grinding wheel rotates (or an axis parallel thereto).

In many grinders, the grinding wheel is constrained to rotate whenever the rotor of the motor rotates, and vice versa. Similarly, components of the drive train may be constrained to rotate with the grinding wheel and/or with the rotor. During the operation of such grinders, if the rotor of the motor or the grinding wheel is forced to come to a sudden stop, this may cause damage to the other components of the grinder (including, for example, the components of the drive train). For instance, in an angle grinder including a pneumatically-driven air motor, a vane of the rotor (or a fragment thereof) may break off when the vane reaches the end of its useful life. If the broken vane, or fragment, is wedged between another vane of the rotor and a cylinder of the air motor, this may cause the air motor to jam and come to a sudden stop, resulting in components of the drive train also being forced to a sudden stop. However, if the air motor has been driving rotation of a grinding wheel with significant mass at significant speed, the inertia of the grinding wheel resist the sudden stop and may thereby cause damage to components of the driven train. Furthermore, such a sudden stop may also tend to loosen the grinding wheel from the grinder.

SUMMARY

According to one aspect, a grinder may comprise an arbor configured to rotate about a first axis and to support a grinding wheel for rotation therewith, a gear surrounding a first portion of the arbor and having a slip fit with the first portion of arbor, a motor configured to supply rotation to a drive train including the gear, a collar surrounding a second portion of the arbor and having an interference fit with the second portion of the arbor such that the collar is constrained for rotation with the arbor about the first axis, and at least one spring disposed between the gear and the collar. The at least one spring may be configured to exert a biasing force along the first axis such that one or more resulting friction forces cause the arbor to rotate with the gear when a torque exerted on the gear is less than a threshold torque.

In some embodiments, arbor may be configured to rotate independently of the gear when the torque exerted on the gear is equal to or greater than the threshold torque. The threshold torque may be set to be equal to or less than a torque required to damage the gear.

In some embodiments, the at least one spring may comprise a plurality of disc springs. Each of the plurality of disc springs may surround a portion of the arbor between the first and second portions of the arbor. The one or more resulting friction forces may comprise a friction force between the gear and one of the plurality of disc springs that contacts the gear and a friction force between the collar and one of the plurality of disc springs that contacts the collar.

In some embodiments, the grinder may further comprise a spindle lock hub surrounding a third portion of the arbor. The first portion of the arbor may be located between the second and third portions of the arbor. The spindle lock hub may be constrained for rotation with the arbor about the first axis. The gear may contact the spindle lock hub, and the one or more resulting friction forces may comprise a friction force between the gear and the spindle lock hub. The gear and the spindle lock hub may be formed of dissimilar materials.

In some embodiments, the grinder may further comprise a thrust washer surrounding a fourth portion of the arbor. The fourth portion of the arbor may be located between the first and third portions of the arbor. The thrust washer may contact both the gear and the spindle lock hub. The one or more resulting friction forces may comprise a friction force between the thrust washer and the gear and a friction force between the thrust washer and the spindle lock hub. The gear and the thrust washer may be formed of dissimilar materials. The spindle lock hub and the thrust washer may be formed of dissimilar materials. For instance, the gear and the spindle lock hub may be formed of alloy steel, while the thrust washer may be formed of bronze.

In some embodiments, the grinder may further comprise a bearing configured to support the arbor during rotation. The bearing may comprise an inner race coupled to the arbor, an outer race coupled to a housing of the grinder, and one or more balls disposed between the inner and outer races. The grinder may further comprise a thrust washer surrounding a third portion of the arbor. The first portion of the arbor may be located between the second and third portions of the arbor. The thrust washer may contact both the gear and the inner race of the bearing.

In some embodiments, that motor may comprise a rotor configured to rotate about a second axis when a flow of compressed air is supplied to the motor. The second axis may be non-parallel to the first axis. The gear surrounding the first portion of the arbor may be a first bevel gear. The drive train may further include a second bevel gear that meshes with the first bevel gear. The second bevel gear may be configured to rotate about the second axis.

In some embodiments, at least a portion of the arbor may be disposed in a cooling chamber configured to receive at least a portion of the air supplied to the motor. At least a portion of the gear may also be disposed in the cooling chamber. A spindle lock hub and a thrust washer of the grinder may also be disposed in the cooling chamber.

According to another aspect, a method of assembling a grinder may comprise sliding a gear onto an arbor of the grinder, where the gear has a slip fit with the arbor and the arbor is configured to support a grinding wheel, sliding one or more disc springs onto the arbor and into contact with the gear, and sliding a collar onto the arbor and into contact with the one or more disc springs, where the collar has an interference fit with the arbor such that the one or more disc springs are maintained in contact with both the gear and the collar. In some embodiment, sliding the collar onto the arbor may comprise sliding the collar along the arbor until each of the one or more disc springs has a substantially flat profile.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
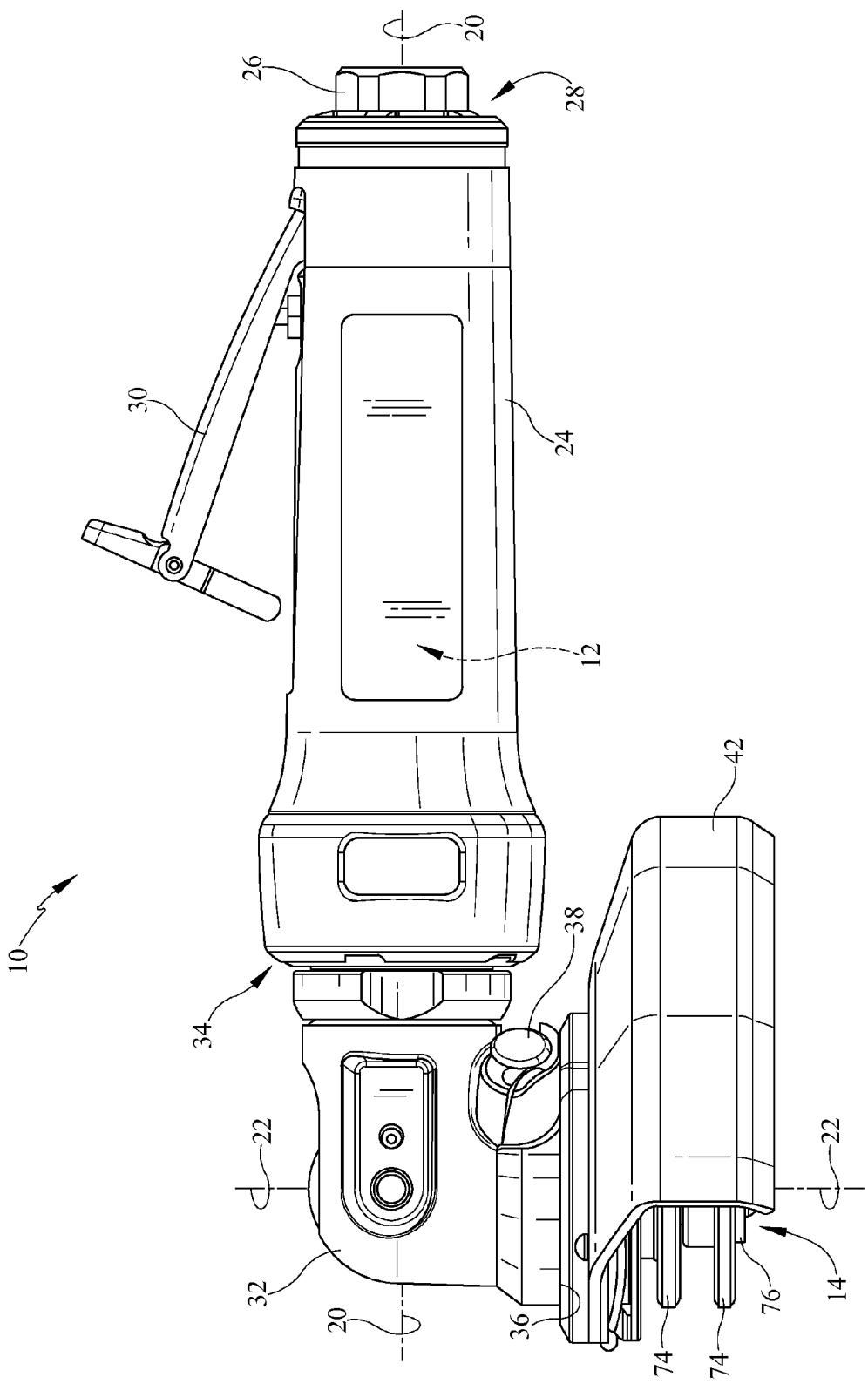
FIG. 1 is a side view of one illustrative embodiment of a grinder.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 2:
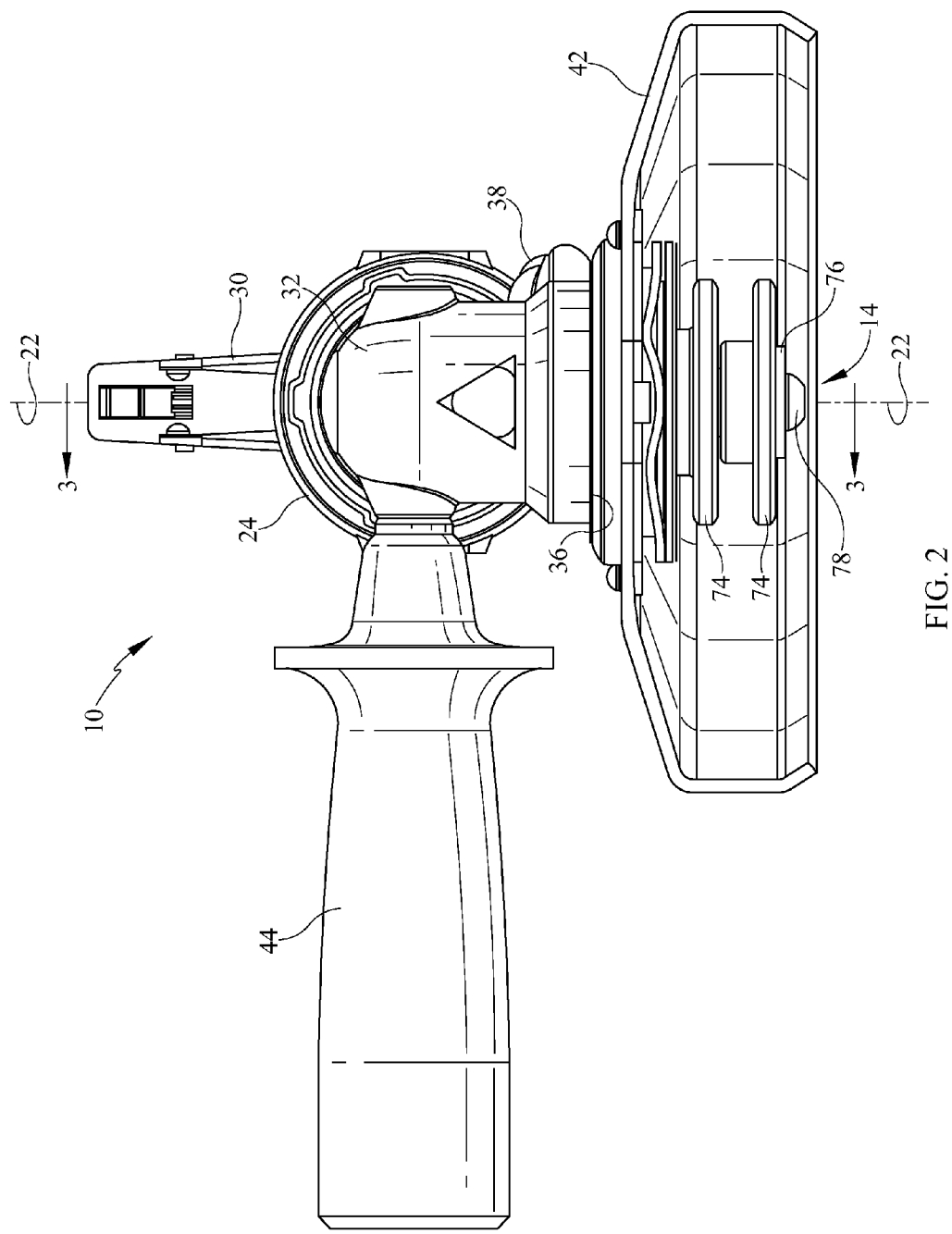
FIG. 2 is an end view of the grinder of FIG. 1.

Referring now to FIGS. 1 and 2, one illustrative embodiment of a grinder 10 is shown in a side view and an end view, respectively. The grinder 10 includes a motor 12 and an arbor 14 configured to support a grinding wheel 16 for rotation with the arbor 14 (see FIG. 3). As shown in the drawings, the grinder 10 is illustratively embodied as a pneumatically-driven angle grinder 10. In particular, the motor 12 is illustratively embodied as an air motor 12 including a rotor 18 configured to rotate about an axis 20 of the grinder 10 when a flow of compressed air is supplied to the motor 12. It is contemplated that, in other embodiments, the motor 12 may be any other type of prime mover, including, but not limited to, an electric motor. The motor 12 is configured to supply rotation to a drive train that drives rotation of the arbor 14 about an axis 22. In the illustrative embodiment of the grinder 10, the axis 22 about which the arbor 14 rotates is non-parallel to the axis 20 about which the rotor 18 rotates. As shown in FIG. 1, the axis 22 is substantially perpendicular to the axis 20. It is contemplated that, in other embodiments, the axis 22 may be disposed at other angles to the axis 20. In still other embodiments, the axis 22 may be substantially parallel to the axis 20 (including being collinear with or spaced apart from the axis 20).

Figure 3:
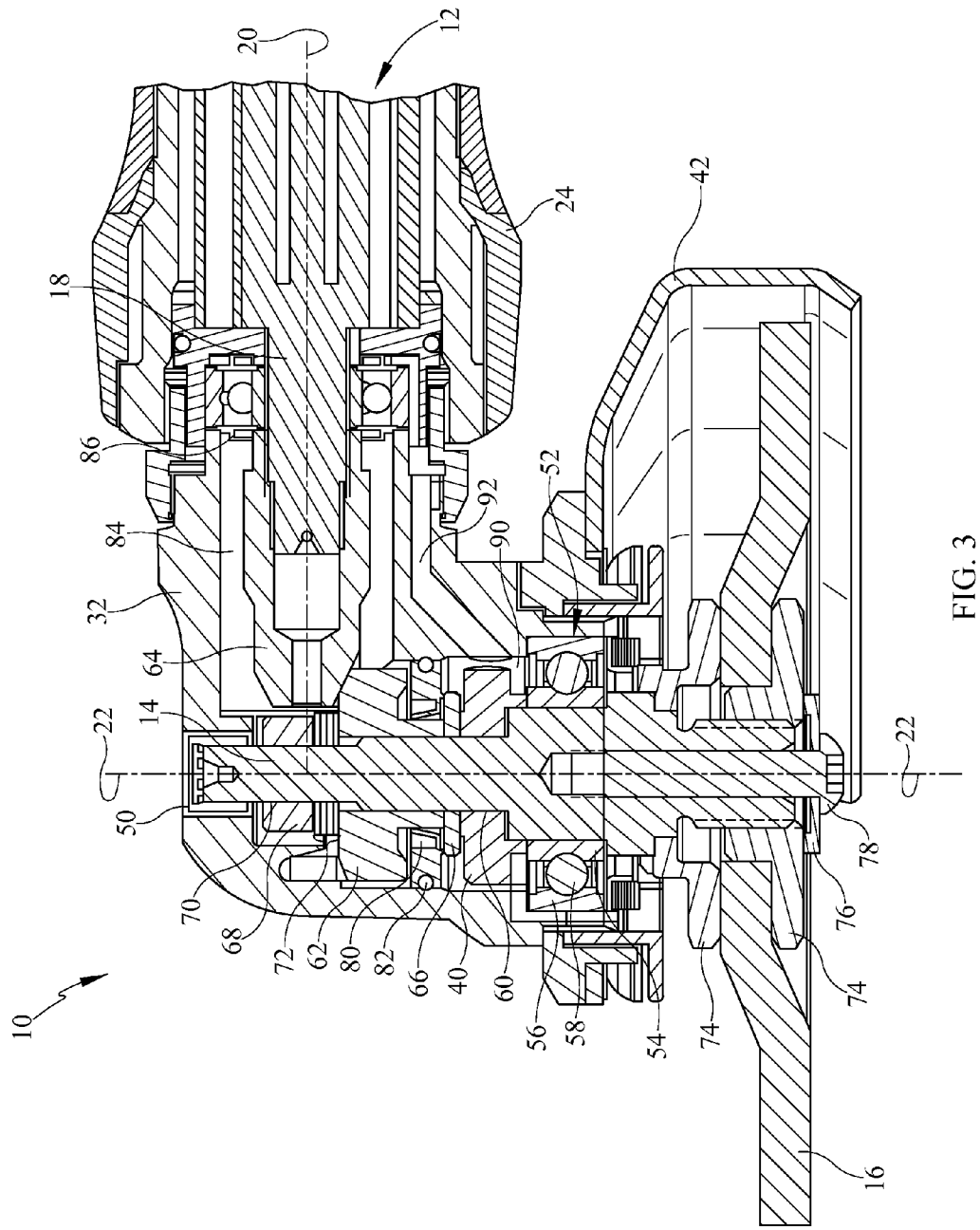
FIG. 3 is a cross-sectional view of selected components of the grinder of FIGS. 1 and 2, taken along the line 3-3 in FIG. 2.

As shown in FIGS. 1-3, the illustrative grinder 10 includes a handle 24 that houses the motor 12. In the illustrative embodiment, an inlet bushing 26 is coupled to a rear end 28 of the handle 24. The inlet bushing 26 is configured to be removably coupled to an air hose (or another conduit of compressed air) to power to the grinder 10. A lever 30 is coupled to the handle 24 such that, when a user grips the handle 24 of the grinder 10, the user may operate the lever 30. The lever 30 cooperates with a throttle (not shown) housed in the handle 24 to control the supply of compressed air from the inlet bushing 26 to the motor 12. As such, a user gripping the handle 24 of the grinder 10 may selectively depress the lever 30 to cause a flow of compressed air to be supplied to the motor 12, thereby causing the rotor 18 of the motor 12 to rotate about the axis 20.

In the illustrative embodiment, the grinder 10 also includes an angle head 32 coupled to a forward end 34 of the handle 24. The angle head 32 houses the drive train of the grinder 10 (although, in some embodiments, portions of the drive train may also be housed in the handle 24). The angle head 32 also houses a portion of the arbor 14, with the remaining portion of the arbor 14 protruding from a bottom side 36 of the angle head 32, as shown in FIGS. 1-3. In the illustrative embodiment, the angle head 32 further houses a spindle lock 38. As described further below, the spindle lock 38 may be selectively engaged by a user of the grinder 10 (e.g., by moving a locking pin of the spindle lock 38 into engagement with a spindle lock hub 40 constrained to rotate with the arbor 14) to prevent rotation of the arbor 14 when the grinder 10 is not being used.

In the illustrative embodiment, the grinder 10 further includes a guard 42 adjustably coupled to the bottom side 36 of the angle head 32 and a second handle 44 removably coupled to a side of the angle head 32 (see FIG. 2). The guard 42 is configured to protect a user from ground material, work pieces, fragments of the grinding wheel 16, and other objects accelerated during operation of the grinder 10. The second handle 44 allows for two-handed operation of the grinder 10 by a user and, in the illustrative embodiment, may be moved from one side of the angle head 32 to the opposite of the angle head 32 to suit a user's preference.

Figure 4:
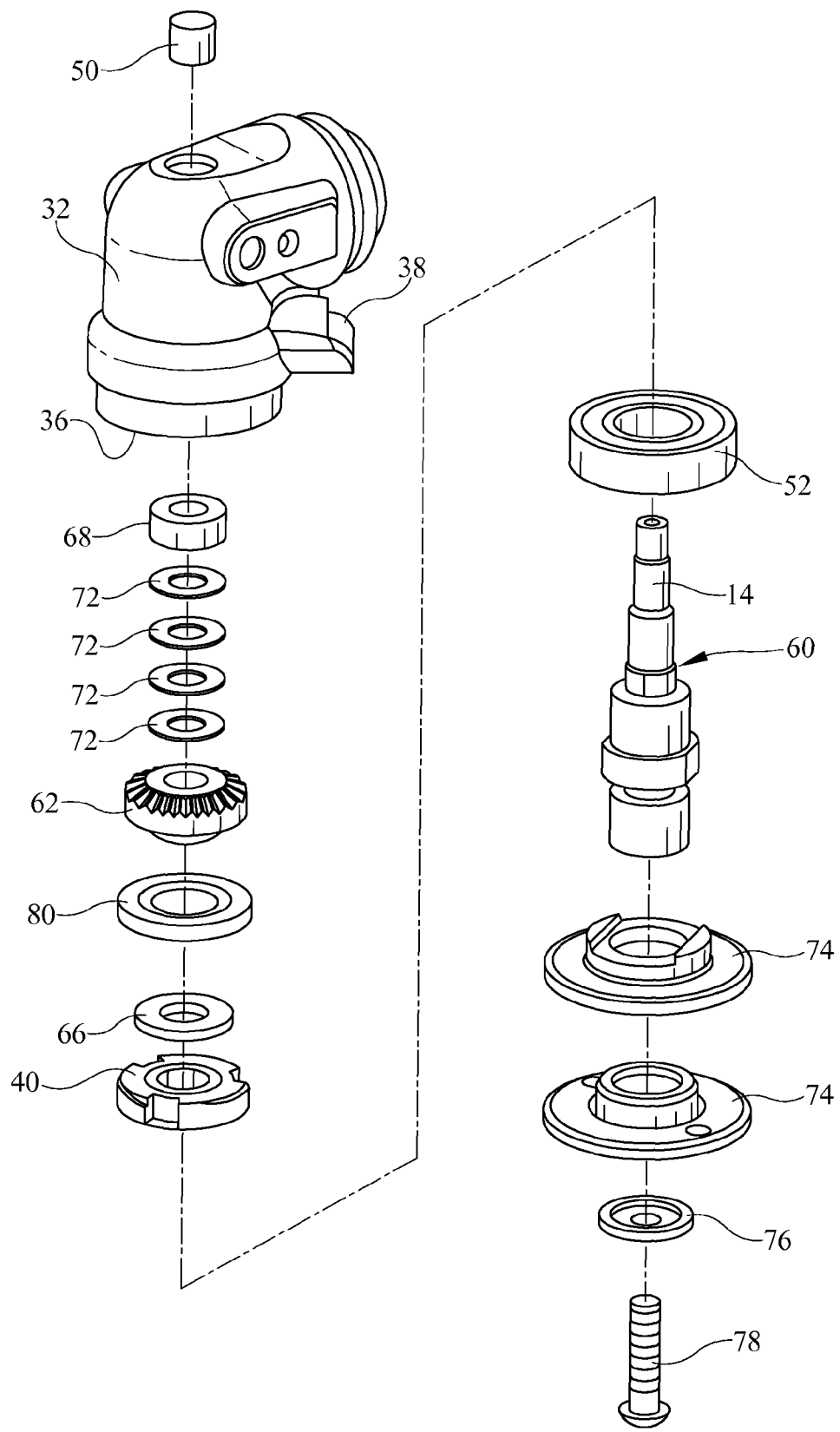
FIG. 4 is an exploded perspective view of selected components of the grinder of FIGS. 1-3.

Referring now to FIGS. 3 and 4, selected components of the grinder 10 are shown in a cross-sectional view (taken along line 3-3 in FIG. 2) and an exploded perspective view, respectively. In the illustrative embodiment, the arbor 14 of the grinder 10 is mounted within the angle head 32 via a pair of bearings 50, 52 that support rotation of the arbor 14 about the axis 22. The bearing 50 is coupled between the angle head 32 and an upper end of the arbor 14, while the bearing 52 is coupled between the angle head 32 and a portion of the arbor 14 nearer its lower end. As best seen in FIG. 3, the bearing 52 includes an inner race 54 coupled to the arbor 14, an outer race 56 coupled to the angle head 32, and a number of balls 58 disposed between the inner and outer races 54, 56. In the illustrative embodiment, the inner race 54 of the bearing 52 is press fit to a portion of the arbor and configured to rotate with the arbor 14 about the axis 22.

As discussed above, the illustrative grinder 10 includes a spindle lock hub 40 that may be selectively engaged (e.g., with a locking pin) to prevent rotation of the arbor 14. As shown in FIG. 3, the spindle lock hub 40 surrounds a portion of the arbor 14 above the bearing 52, contacting the inner race 54 of the bearing 52. In the illustrative embodiment, the spindle lock hub 40 is constrained to rotate with the arbor 14 about the axis 22 via a hex interface 60 between an inner surface of the spindle lock hub 40 and the corresponding portion of the arbor 14. In other words, the interior of the spindle lock hub 40 is formed to include a hexagonally shaped void and the corresponding portion of arbor 14 has a hexagonal cross-section that mates with the spindle lock hub 40. In other embodiments, the spindle lock hub 40 may be constrained to rotate with the arbor 14 via other types of interfaces and/or coupling mechanisms.

The grinder 10 also includes a gear 62 that surrounds a portion of the arbor 14 and has a slip fit with the arbor 14. In other words, absent additional forces on the gear 62 (as described further below), the gear 62 is free to rotate about the axis 22 independently of the arbor 14 and vice versa. The gear 62 forms part of the drive train of the grinder 10 that transmits rotation from the rotor 18 of the motor 12 to the arbor 14 (and, ultimately, to the grinding wheel 16). As shown in FIGS. 3 and 4, the gear 62 is illustratively embodied as a bevel gear 62. In the illustrative embodiment, the drive train of the grinder 10 also includes a bevel gear 64 that meshes with the bevel gear 62. As shown in FIG. 3, the bevel gear 64 is coupled to the rotor 18 of the motor 12 such that the bevel gear 64 rotates about the axis 20 with the rotor 18. It is contemplated that, in other embodiments, the drive train of the grinder 10 may include additional and/or different components than those shown in FIG. 3.

In the illustrative embodiment, the grinder 10 includes a thrust washer 66 disposed between the spindle lock hub 40 and the bevel gear 62. As such, the thrust washer 66 contacts both the spindle lock hub 40 and the bevel gear 62. The thrust washer 66 surrounds a portion of the arbor 14 that is between the portion of the arbor 14 surrounded by the spindle lock hub 40 and the portion of the arbor 14 surrounded by the bevel gear 62. In the illustrative embodiment, the thrust washer 66 is formed of a material that is dissimilar from the material used to form the spindle lock hub 40 and also from the material used to form the bevel gear 62. The dissimilar material of the thrust washer 66 as compared to the spindle lock hub 40 and the bevel gear 62 helps to prevent galling at the interfaces between these components. For instance, in one embodiment, the spindle lock hub 40 and the bevel gear 62 may be formed of alloy steel, while the thrust washer 66 may be formed of bronze. It will be appreciated that, in other embodiments, other materials (e.g., an iron material, such as ductile iron, with relatively high graphite content to resist galling) may be used for the spindle lock hub 40, the bevel gear 62, and/or the thrust washer 66. It is also contemplated that, in some embodiments of the grinder 10, the thrust washer 66 may be omitted, and the spindle lock hub 40 and the bevel gear 62 may be in contact with one another. In such embodiments, the spindle lock hub 40 and the bevel gear 62 may be formed of dissimilar materials to help prevent galling at the interface between these components.

The grinder 10 also includes a collar 68 that surrounds a portion of the arbor 14 and has an interference fit with the arbor 14. In other words, the collar 68 is held in place by a friction interface 70 between the collar 68 and the arbor 14, rather than by some other means of fastening. In some embodiments, the collar 68 may be press fit to the arbor 14. Due to the interference fit between the collar 68 and the arbor 14, the collar 68 is constrained for rotation with the arbor 14 about the axis 22. The portion of the arbor 14 surrounded by the collar 68 is spaced apart from the portion of the arbor 14 surrounded by the bevel gear 62.

The grinder 10 further includes at least one spring 72 disposed between the bevel gear 62 and the collar 68. The collar 68 maintains each spring 72 in an at least partially compressed state, such that each spring 72 exerts a biasing force along the axis 22 against the bevel gear 62. In the illustrative embodiment, the at least one spring 72 is embodied as a number of disc springs 72 (also sometimes referred to as "Belleville springs") that each surround a portion of the arbor 14 between the portion of the arbor 14 surrounded by the bevel gear 62 and the portion of the arbor 14 surrounded by the collar 68. The disc springs 72 each have a generally convex or concave profile (i.e., when viewed from the side) when unloaded, which collapses toward a substantially flat profile when loaded. As shown in FIG. 3, the collar 68 maintains the disc springs 72 in a compressed state in which the each of the disc springs 72 has a substantially flat profile.

During operation of the grinder 10, the bevel gear 62 will be supplied with rotation from the rotor 18 of the motor 12, via the bevel gear 64. During this rotation, the biasing force exerted along (i.e., parallel to) the axis 22 by the disc springs 72 will result in one or more friction forces between the bevel gear 62, the disc springs 72, the collar 68, the thrust washer 66, and spindle lock hub 40. In particular, in the illustrative embodiment of FIG. 3, the biasing force exerted by the disc springs 72 may result in a friction force between the bevel gear 62 and a disc spring 72 that contacts the bevel gear 62, a friction force between the collar 68 and a disc spring 72 that contacts the collar 68, a friction force between two of the disc springs 72, a friction force between the bevel gear 62 and the thrust washer 66, and/or a friction force between the thrust washer 66 and the spindle lock hub 40. In embodiments in which the thrust washer 66 is not used and the bevel gear 62 instead contacts the spindle lock hub 40, the biasing force exerted by the disc springs 72 may result in a friction force between the bevel gear 62 and the spindle lock hub 40.

Where the torque exerted on the bevel gear 62 is less than a threshold torque, the one or more friction forces resulting from the biasing force exerted by the disc springs 72 will cause the arbor 14 to rotate with the bevel gear 62. In other words, due to the one or more friction forces described above, torque will be transmitted from the bevel gear 62 to the collar 68 and/or to the spindle lock hub 40. This torque will then be transmitted to the arbor 14 via the friction interface 70 (i.e., the interference fit) between the collar 68 and the arbor 14 and/or via the hex interface 60 between the spindle lock hub 40 and the arbor 14. By contrast, where the torque exerted on the bevel gear 62 is equal to or greater than the threshold torque, the one or more friction forces will be insufficient to cause the arbor 14 to rotate with the bevel gear 62. In other words, slippage will occur that allows the arbor 14 to rotate independently of the bevel gear 62 and vice versa. In the illustrative embodiment, this slippage might occur between the bevel gear 62 and one of the disc springs 72, between the collar 68 and one of the disc springs 72, between two of the disc springs 72, between the bevel gear 62 and the thrust washer 66, and/or between the thrust washer 66 and the spindle lock hub 40. The magnitude of the biasing force exerted by the disc springs 72, the radii of the components in contact (i.e., the bevel gear 62, the disc springs 72, the collar 68, the thrust washer 66, and spindle lock hub 40), and the friction coefficients of the materials used to form these components will all impact the threshold torque in a particular embodiment. In some embodiments, the components of the grinder 10 may be designed such that the threshold torque is equal to or less than a torque required to damage the bevel gear 62.

This friction drive of the grinder 10 helps to prevent damage to the drive train (as well as other components) of the grinder 10 in the event that the rotor 18 of the motor 12 and/or the grinding wheel 16 comes to a sudden stop during operation (as described in the Background section). For instance, in a grinder not including the presently disclosed friction drive, a sudden stoppage of an air motor (e.g., due to vane failure) may result in components of a drive train of the grinder experiencing an exceedingly high torque as those components absorb the kinetic energy of a rotating grinding wheel, possibly resulting in significant damage to one or more components of the drive train. By contrast, if the motor 12 of the presently disclosed grinder 10 were to stop suddenly, slippage would occur (as described above) once the threshold torque was met or exceeded, such that the arbor 14 rotated independently of the bevel gear 62, preventing damage to the components of the grinder 10. The friction drive of the presently disclosed grinder 10 may also allow the grinding wheel 16 and the arbor 14 to decelerate more slowly, thereby reducing the tendency of the grinding wheel 16 to loosen from the arbor 14 (particularly where the grinding wheel 16 is removably coupled to the arbor 14 using a pair of flanges 74, a washer 76, and a screw 78, as shown in FIG. 3).

Although the illustrative embodiment of the grinder 10 has been shown and described as including a spindle lock 38, it is contemplated that, in other embodiments, the spindle lock 38 (and, thus, the spindle lock hub 40) may be omitted from the grinder 10. In such embodiments, the thrust washer 66 may contact the inner race 54 of the bearing 52, or some other component or feature extending radially outward from the arbor 14. In still other embodiments (where neither the spindle lock hub 40 nor the thrust washer 66 is used), a lower surface of the bevel gear 62 may contact the inner race 54 of the bearing 52, or some other component or feature extending radially outward from the arbor 14. In each of these alternative embodiments of the grinder 10, a contact surface between the thrust washer 66 or the bevel gear 62 and the inner race 54 of the bearing 52 (or another component or feature) may provide an interface at which a friction force may transmit torque or at which slippage may occur, depending on whether the threshold torque has been met or exceeded.

As shown in FIG. 3, the grinder 10 also includes a lip seal 80 that seals against a cylindrical outer surface of the bevel gear 62. The lip seal 80 is stationary (relative to the arbor 14) and is maintained in its position by friction with an o-ring 82. The lip seal 80 is configured to reduce grease leakage out of a gear chamber 84 that houses, among other components, the bevel gear 62 and the bevel gear 64. A felt wiper-cup assembly 86, positioned near the motor 12, is also configured to reduce grease leakage from the gear chamber 84.

In the illustrative embodiment, the grinder 10 further includes a cooling chamber 90 that receives at least a portion of the air supplied to the motor 12. The angle head 32 of the grinder 10 is formed with a number of air passages 92 that capture air leaking past the rotor 18 of the motor 12 and direct the air into the cooling chamber 90. The mesh of the bevel gears 62, 64, the churning of grease in the grease chamber 84, and the friction between the bevel gear 62 and the lip seal 80 will all generate heat in the grinder 10. As shown in FIG. 3, a portion of the arbor 14, a portion of the bevel gear 62, the spindle lock hub 40, and the thrust washer 66 are all disposed in the cooling chamber 90. As such, air passing through the cooling chamber 90 will remove heat from these components of the grinder 10 (before this air is exhausted from the grinder 10). Furthermore, the intimate contact between the arbor 14, the bearing 52, the spindle lock hub 40, the thrust washer 66, and the bevel gear 62 (resulting from the biasing force exerted along the axis 22 by the disc springs 72) will increase the heat transfer efficiency.

It will be appreciated from the foregoing that the presently disclosed grinder 10 allows for simpler assembly of the arbor 14, as compared to prior designs. For instance, in the illustrative embodiment, assembling the grinder 10 may involve, among other steps, sliding the bevel gear 62 onto the arbor 14, then sliding the disc springs 72 onto the arbor 14 and into contact with the bevel gear 62, and then sliding the collar 68 onto the arbor 14 and into contact with the disc springs 72. Due to the interference fit between the collar 68 and the arbor 14, the collar 68 will maintain the disc springs 72 in contact with both the bevel gear 62 and the collar 68, achieving a desired friction torque between the bevel gear 62 and the arbor 14 without the need to tighten any set screws or to perform another similarly cumbersome operation.

In some embodiments, assembling the grinder 10 may involve sliding the collar 68 onto the arbor 14 until each of the disc springs 72 has a substantially flat profile (i.e., when viewed from the side, as shown in FIG. 3). In this way, the disc springs 72 may be pre-loaded to exert a particular biasing force along the axis 22 (thereby resulting in the desired friction torque between the bevel gear 62 and the arbor 14). After the bevel gear 62, the disc springs 72, and the collar 68 (as well as other components in some embodiments, such as the bearing 52, the spindle lock hub 40, the thrust washer 66, the lip seal 80, and the bearing 50) have been assembled with the arbor 14, as described above, the arbor 14 may then be mounted in the angle head 32.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A grinder comprising:
    an arbor configured to rotate about a first axis, the arbor being configured to support a grinding wheel for rotation therewith;
    a gear surrounding a first portion of the arbor and having a slip fit with the first portion of arbor;
    a motor configured to supply rotation to a drive train including the gear;
    a collar surrounding a second portion of the arbor and having an interference fit with the second portion of the arbor such that the collar is constrained for rotation with the arbor about the first axis;
    at least one spring disposed between the gear and the collar, the at least one spring configured to exert a biasing force along the first axis such that one or more resulting friction forces cause the arbor to rotate with the gear when a torque exerted on the gear is less than a threshold torque; and
    a spindle lock hub surrounding a third portion of the arbor, the spindle lock hub being constrained for rotation with the arbor about the first axis, the first portion of the arbor being located between the second and third portions of the arbor.

2. The grinder of claim 1, wherein the arbor is configured to rotate independently of the gear when the torque exerted on the gear is equal to or greater than the threshold torque.

3. The grinder of claim 2, wherein the threshold torque is set to be equal to or less than a torque required to damage the gear.

4. The grinder of claim 1, wherein the at least one spring comprises a plurality of disc springs, each of the plurality of disc springs surrounding a portion of the arbor between the first and second portions of the arbor.

5. The grinder of claim 4, wherein the one or more resulting friction forces comprise:
   a friction force between the gear and one of the plurality of disc springs that contacts the gear; and
   a friction force between the collar and one of the plurality of disc springs that contacts the collar.

6. The grinder of claim 1, wherein the gear contacts the spindle lock hub and the one or more resulting friction forces comprise a friction force between the gear and the spindle lock hub.

7. The grinder of claim 6, wherein the gear and the spindle lock hub are formed of dissimilar materials.

8. The grinder of claim 1, further comprising a thrust washer surrounding a fourth portion of the arbor, the fourth portion of the arbor being located between the first and third portions of the arbor, the thrust washer contacting both the gear and the spindle lock hub.

9. The grinder of claim 8, wherein the one or more resulting friction forces comprise:
   a friction force between the thrust washer and the gear; and
   a friction force between the thrust washer and the spindle lock hub.

10. The grinder of claim 9, wherein:
    the gear and the thrust washer are formed of dissimilar materials; and
    the spindle lock hub and the thrust washer are formed of dissimilar materials.

11. The grinder of claim 10, wherein:
    the gear and the spindle lock hub are formed of alloy steel; and
    the thrust washer is formed of bronze.

12. A grinder further comprising:
    an arbor configured to rotate about a first axis, the arbor being configured to support a grinding wheel for rotation therewith;
    a gear surrounding a first portion of the arbor and having a slip fit with the first portion of arbor;
    a motor configured to supply rotation to a drive train including the gear;
    a collar surrounding a second portion of the arbor and having an interference fit with the second portion of the arbor such that the collar is constrained for rotation with the arbor about the first axis;
    at least one spring disposed between the gear and the collar, the at least one spring configured to exert a biasing force along the first axis such that one or more resulting friction forces cause the arbor to rotate with the gear when a torque exerted on the gear is less than a threshold torque;
    a bearing configured to support the arbor during rotation, the bearing comprising (i) an inner race coupled to the arbor, (ii) an outer race coupled to a housing of the grinder, and (iii) one or more balls disposed between the inner and outer races; and
    a thrust washer surrounding a third portion of the arbor, the first portion of the arbor being located between the second and third portions of the arbor, the thrust washer contacting both the gear and the inner race of the bearing.

13. A grinder comprising:
    an arbor configured to rotate about a first axis, the arbor being configured to support a grinding wheel for rotation therewith;
    a gear surrounding a first portion of the arbor and having a slip fit with the first portion of arbor;
    a motor configured to supply rotation to a drive train including the gear, the motor including a rotor configured to rotate about a second axis when a flow of compressed air is supplied to the motor;
    a collar surrounding a second portion of the arbor and having an interference fit with the second portion of the arbor such that the collar is constrained for rotation with the arbor about the first axis; and
    at least one spring disposed between the gear and the collar, the at least one spring configured to exert a biasing force along the first axis such that one or more resulting friction forces cause the arbor to rotate with the gear when a torque exerted on the gear is less than a threshold torque,
    wherein at least a portion of the arbor is disposed in a cooling chamber configured to receive at least a portion of the air supplied to the motor and at least a portion of the gear is disposed in the cooling chamber.

14. The grinder of claim 13, further comprising:
    a spindle lock hub surrounding a third portion of the arbor, the first portion of the arbor being located between the second and third portions of the arbor, the spindle lock hub being constrained for rotation with the arbor about the first axis; and
    a thrust washer surrounding a fourth portion of the arbor, the fourth portion of the arbor being located between the first and third portions of the arbor, the thrust washer contacting both the gear and the spindle lock hub;
    wherein the spindle lock hub and the thrust washer are each disposed in the cooling chamber.

15. The grinder of claim 13, wherein the second axis is non-parallel to the first axis.

16. The grinder of claim 15, wherein:
    the gear surrounding the first portion of the arbor is a first bevel gear; and
    the drive train further includes a second bevel gear that meshes with the first bevel gear, the second bevel gear being configured to rotate about the second axis.

* * * * *